3,325,225
ALERTNESS DETECTION SYSTEM FOR
VEHICLE OPERATORS
John F. Yerger, 1976 Morrison Ave.,
Union, N.J. 07083
Filed Aug. 14, 1964, Ser. No. 389,534
4 Claims. (Cl. 303—19)

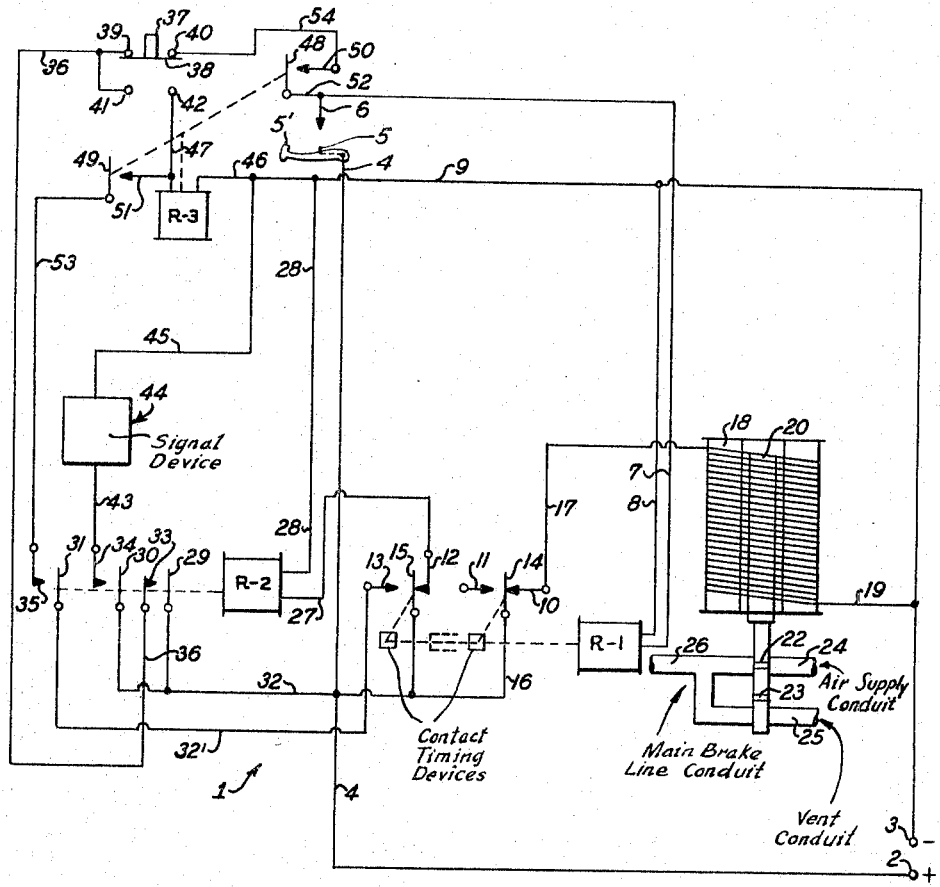

This invention relates to vehicle control systems, and in particular to a system designed for use in association with the brake apparatus of a vehicle in a manner to require continued alertness of the operator while the vehicle is in motion and to effectuate an automatic actuation of the vehicle brakes or shut off the power required for the motion of the vehicle in the event of a failure on the part of the operator to perform periodically an act evidencing his alertness.

As is well known, certain types of vehicles, e.g. railway locomotives, are generally equipped with a "dead man's control" which is a pressure-responsive member associated with the brake apparatus of such a vehicle for the purpose of ensuring that the brakes will be automatically applied and the vehicle brought to a halt if the operator should happen to release the pressure from said member. Nevertheless, it has been found that this type of control is not foolproof, since the vehicle operator is frequently able to "disarm" it by maintaining the member in its depressed state, for example by loading it down with a tool box or other heavy object readily available to him. In these types of controls which utilize sonic or electronic devices, the operation of which depend on movement of the operator's body, these devices cannot detect whether the operator is dead, asleep, or unconscious and may readily be rendered inoperative by suspending a hat or other object over or near the operator's seat. A serious deficiency in these prior controls has been, therefore, that not only lack of alertness on the part of the operator, but even his succumbing to a temporary or permanent illness or indisposition while the vehicle is in operation may fail to result in the automatic stopping of the train, with possibly disastrous consequences.

It is an important object of the present invention to provide a "dead man's control" system for automotive vehicles which is simple in construction, yet highly reliable in operation.

Another object of the present invention is the provision of such a control system wherein the alertness of the vehicle operator is repeatedly and periodically checked upon, so that a lack of alertness continued for more than a relatively short time interval is immediately detected and automatically used to actuate the brakes of the vehicle.

A more specific object of the present invention is the provision of such a control system in which at predetermined time intervals while the vehicle is in operation, a first stimulus or signal is given to the operator to indicate to him that in the absence of a prescribed responsive action to said stimulus or signal within a relatively short preset time interval thereafter, the application of the vehicle brakes will automatically ensue.

Still another object of the persent invention is the provision of an alertness detection and vehicle control system as aforesaid the operating parts of which are entirely inaccessible to the vehicle operator and thus are immune to tampering or being locked in their operative positions.

Yet another object of the present invention is the provision of such a control system which is relatively inexpensive to produce and avoids the cost and complexity generally characterizing heretofore known electronic, sonic, pneumatic and mechanical systems designed for the same purpose.

The foregoing and other objects, characteristics and advantages of the present invention will be more clearly understood from the following detailed description thereof when read in conjunction with the accompanying drawing, the sole figure of which is a schematic wiring diagram of the circuitry constituting the alertness detection and vehicle control system of the present invention.

Referring now to the drawing in greater detail, the vehicle control and alertness detection system according to the present invention comprises an electric circuit 1 having positive and negative input terminals 2 and 3. The positive power line 4 is connected to a movable contact member 5 which is associated, either mechanically as shown in the drawing, or through a suitable relay (not shown), with the manually operated throttle control lever 5' in such a manner as to engage stationary contact 6 when the vehicle operating power is shut off. When the unit is not used as a lead unit in a multiple unit group the alertness detector device would not be required and would be inactive. Contacts 5 and 6 would not be supplied on units normally used as a single unit as they also would be equipped with the other control apparatus required for multiple unit use. The contact 6 is connected via a conductor 7 to one terminal of the coil of a relay R-1, the other terminal of which is connected by a conductor 8 to the negative power line 9.

The relay R-1 is a special type of relay the construction and operation of which will be more fully discussed hereinafter, but in essence comprises two pairs of opposed stationary contacts 10–11 and 12–13 associated, respectively, with two intermediate movable contact members 14 and 15. The movable contact members 14 and 15 are connected by a conductor 16 to the positive power line 4. The stationary contact 10 is connected by a conductor 17 to one terminal of the coil of a solenoid or electromagnet 18, the other terminal of which is connected by a conductor 19 to the negative power line 9. In the circuit 1, the stationary contact 11 is inactive.

The solenoid or electromagnet 18 is provided with a movable core 20 to one end of which is attached a valve member 21 provided with a pair of spaced transverse ports or passageways 22 and 23. The valve member 21 extends slidably through a pair of conduits 24 and 25, and the ports 22 and 23 in the valve member are so spaced relative to each other than in the indrawn position of the core 20 the port 22 registers with the conduit 24 while the port 23 is out of registry with the conduit 25, whereas in the protracted or dropped position of the core the port 23 registers with the conduit 25 while the port 22 is out of registry with the conduit 24. The conduit 24 is connected to the usual air pump or compressor carried by the vehicle for the purpose of providing air pressure for the brakes, while the conduit 25 is vented to the atmosphere. Both these conduits at the other side of the valve member 21 merge into a common line 26 which is the main brake line controlled by the operator's brake lever, but bypassing the manually operated brake valve to actuate an automatic application of the brakes.

The stationary contact 12 of the relay R-1 is connected by a conductor 27 to one terminal of the coil of a relay R-2, the other terminal of which is connected by a conductor 28 to the negative power line 9. The relay R-2 comprises three ganged movable contact members 29, 30 and 31. Contacts 29 and 30 are connected by a common conductor 32 to the positive power line 4, and contact 31 is connected to contact 13 on relay R-1 through a wire 32'. Contacts 29, 30 and 31 cooperate with respective stationary contacts 33, 34 and 35, and the arrangement is such that the movable contact members 29 to 31 are disengaged from their stationary contacts 33 to 35 whenever the relay is energized (the condition illustrated in the drawing) and engage the said stationary contacts only when the relay is deenergized. As a result of this arrangement the circuit is caused to be of the "fail-safe" type in that even though any of the relays are functioning improperly due to a broken wire or loss of power, the circuit will still cause the device to function to actuate the brakes after the time has run out.

The stationary contact 33 of the relay R–2 is connected by a conductor 36 to a push button switch 37 having, for example, a movable contact member 38 normally bridging a first pair of stationary contacts 39 and 40 and resiliently shiftable, as indicated in broken lines, to bridge a second pair of stationary contacts 41 and 42, of which the contact 41 is also connected to the conductor 36. The stationary contact 34 of the relay R–2 is connected by a conductor 43 to one terminal of a suitable signal-emitting device 44, preferably an electrically actuatable bell, buzzer or whistle, the other terminal of which is connected by a conductor 45 to the negative power line 9. Also connected to the line 9 by a conductor 46 is one terminal of the coil of a relay R–3, the other terminal of which is connected by a conductor 47 to the push button switch contact 42.

The relay R–3 comprises a pair of ganged movable contact members 48 and 49 cooperating, respectively, with a pair of stationary contacts 50 and 51. The movable contact member 48 of the relay R–3 is connected by a conductor 52 to the conductor 7 between the stationary throttle lever contact 6 and the coil of the relay R–1, and the movable contact member 49 of the relay R–3 is connected by a conductor 53 to the stationary contact 35 of the relay R–2. The stationary contact 50 of the relay R–3 is connected by a conductor 54 to the push button switch contact 40, while the stationary contact 51 of the relay R–3 is connected to the conductor 47 and thus to both the coil of the relay R–3 and the push button switch contact 42.

Reverting now to the relay R–1, this relay is employed in the system according to the present invention for effecting the timed signaling and alertness detecting operations thereof. The principal operating characteristic required for the relay R–1 is, therefore, that it have two movable contact members which are shifted simultaneously to respective circuit-closing positions upon energization of the relay, but which move to their circuit-opening positions at different times upon deenergization of the relay, with one contact member opening a first predetermined time interval after such deenergization, and with the other contact member opening a second predetermined time interval after the opening of the first contact member. A particular time delay relay which I have found highly suited for this purpose is presently being marketed under the trademark "AGASTAT" by the Elastic Stop Nut Corporation of America, Elizabeth Division, in Elizabeth, N.J., and is known and available commercially as a "Type 2 AGASTAT" time delay relay.

This relay is designed for effecting the required two-step breaking of its contact arrangements upon deenergization. Its essential construction, circuitry and contact arrangements are generally illustrated and described in the manufacturer's brochure SR–4 (as revised) dated July 1963. As there shown, the relay comprises a main switch, corresponding to the movable contact member 14 herein, and an auxiliary switch, corresponding to the movable contact member 15 herein. The arrangement is such that upon energization of the coil, both switches transfer instantly to make the previously open contacts and break the previously closed contacts. Immediately upon deenergizaation, the time delay starts. At the end of the preset delay period thereafter, fixed by the setting of a suitable cam arrangement, the auxiliary switch returns to its starting position. After a further preset delay period, the main switch returns to its starting position. The "AGASTAT" relay is equipped with a dial head for setting the time delay, and six variations of the dial head are available from the manufacturer to achieve respective timing ranges as small as 0.10 to 1.0 second and as large as 10.0 seconds to 5 minutes. For the purposes of the present invention, a relay constructed for the largest timing range is most preferably employed. The delay between the opening of the auxiliary and main switches can also be readily varied, and for the purposes of the present invention will ordinarily be set to be between about 15 and 30 seconds.

The operation of the system according to my invention will now be described by way of example as applied to a railway locomotive or like vehicle.

With the vehicle at stop and the throttle closed, or when the unit is in use as other than a lead unit in a multiple unit group, the movable contact member 5 associated with said lever is in its closed position, as illustrated in solid lines, completing the energization circuit for the timing relay R–1. The movable contact members 14 and 15 of the latter thus are also in the positions illustrated, i.e. in engagement with the stationary contacts 10 and 12. Due to the engagement of the movable contact member 14 (the main switch) with the stationary contact 10, power is supplied to the solenoid or electromagnet 18 so as to draw the core 20 thereof in and establish registry of the valve port 22 with the conduit 24, enabling the brake lines of the train to be charged. Concurrently, due to the engagement of the movable contact member 15 (the auxiliary switch) with the stationary contact 12, the energization circuit for the relay R–2 is completed from the positive power line 4 through the conductors 15, 27 and 28 to the negative power line 9, whereby the movable contact members 29, 30 and 31 of this relay are retained in their illustrated positions out of engagement with the associated stationary contacts 33, 34 and 35. Both the relay R–3 and the signal device 44 are, therefore, deenergized and inactive.

When the operator now moves his throttle lever to set the vehicle in motion, the movable contact member 5 is disengaged from the stationary contact 6, thereby breaking the energization circuit for the relay R–1. This initiates the timing cycle. Assuming, for example, that the vehicle is an "over the road" engine, i.e. a locomotive hauling a train on an extended trip (as distinguished from the short movements of a yard engine), the relay R–1 will have been set for a major delay period (from deenergization to opening of the auxiliary switch 15) of about 5 minutes and for a minor delay (from opening of the auxiliary switch to opening of the main switch 14) of about 30 seconds. Upon deenergization of the relay R–1, therefore, an interval of five minutes will pass without any movement of the contact members 14 and 15. At the end of this time interval, the auxiliary switch 15 is shifted out of engagement with the contact 12 and comes into engagement with contact 13. This breaks the energization circuit for the relay R–2, and enables the movable contact members 29, 30 and 31 thereof to drop against their respective stationary contacts 33, 34 and 35. As soon as this happens, the engagement between the movable contact member 30 and the stationary contact 34 completes the energization circuit for the signal device 44 from the positive power line 4 through conductors 32, 43 and 45 to the negative power line 9 and causes an audible sound to be emitted in the cab to serve as a warning to the vehicle operator that he must now perform a secondary control operation in order to maintain the vehicle moving in its normal manner. Stationary contact 13 on relay R–1 is connected through a wire to movable contact 31 on relay R–2 and movable contact 31 is engaged with stationary contact 35 and connected by wire 53 to movable contact 49 on relay R–3.

Should the operator fail to respond to the signal, the cam arrangement of the timing relay R–1 ensures that after 30 seconds, in the absence of the control operation still to be described, the main switch 14 is shifted out of engagement with the contact 10 to deenergize the solenoid or electromagnet 18. This permits the core 20 to be shifted relatively to the magnet coil so as to bring the valve port 23 into registry with the conduit 25 while deregistering the port 22 and conduit 24 to block the latter. The vehicle brake lines 26 will thus be vented to the atmosphere, whereby the application of the vehicle brakes will automatically occur.

If the operator of the vehicle is on the alert, however, and heeds the warning signal, he can prevent such an automatic application of the brakes. To this end, in the period of 30 seconds immediately following the start of the signal and with the main switch 14 of the timing relay R–1 still closed, the operator depresses the push button 37 so as to displace the contact member 38 thereof from its solid-line position to its broken line position. This completes the energization circuit for the relay R–3 from the positive power line 4 through the conductor 32, the movable contact member 29 and stationary contact 33 of relay R–2, the conductor 36, the stationary push button contacts 41 and 42, and conductors 47 and 46 to the negative power line 9. With relay R–3 thus energized, the movable contact members 48 and 49 thereof are drawn into engagement with the respective stationary contacts 50 and 51. The relay R–3 will now be held in its energized state, since an energization circuit therefor is completed from the positive power line 4 through movable contact 15 and stationary contact 13 on relay R–1 through the conductor, the closed contacts 31–35 on relay R–2, the conductor 53, the closed contacts 49–51 of relay R–3, and the conductor 46 to the negative power line 9, even though the push button 37 is released immediately after being depressed and permitted to return to its normal position bridging the terminals 39 and 40.

As soon as the push button returns to its starting (solid line) position, the energization circuit for the timing relay R–1 is again completed from the positive power line 4 through the conductor 32, the still closed contacts 29–33 of relay R–2, the conductor 36, the push button contacts 39 and 40, the closed contacts 48–50 of relay R–3, and conductors 52, 7 and 8 to the negative power line 9. The previously opened auxiliary switch 15 of the timing relay R–1 is thus drawn back into engagement with the stationary contact 12, reenergizing the relay R–2 and drawing the movable contacts 29, 30 and 31 away from their stationary contacts 33, 34 and 35. This stops the operation of the signal device 44 by moving contact 15 on relay R–1 away from stationary contact 13 and by moving contact 31 away from the stationary contact 35 on relay R–2 to break the holding circuit for the relay R–3. As the latter becomes deenergized, its movable contact 48 is drawn away from the stationary contact 50, which breaks the energization circuit for the timing relay R–1. The entire timing cycle then starts all over again, and the described sequence of operations will be repeated after another lapse of 5 minutes when the auxiliary switch 15 of the timing relay R–1 is again opened, and so on, until the vehicle is brought to a normal halt.

It is to be noted that the operator of the vehicle cannot defeat the purpose of the system according to my invention by holding the push button 37 in its depressed condition continuously or for more than 30 seconds after the start of the signal from the device 44. With the push button depressed, the timing relay R–1 cannot be reenergized after having once been deenergized, and thus shortly after the opening of the contact or auxiliary switch 15 the main switch 14 will automatically open to deenergize the solenoid or electromagnet 18, thereby to effect the automatic application of the vehicle brakes as previously described. Moreover, since the entire system entails only the use of relatively small electric circuit elements, none of which may be expected to fail within the normal period of useful life of the vehicle, all of these elements may normally be permanently enclosed either in the housing atop which the operator's brake lever is mounted or in a special auxiliary housing, and thus made inaccessible to the operator under ordinary circumstances. An unauthorized shorting out of the contact members 5 and/or 14 to the end of preventing a possible deenergization of the electromagnet 18 is, therefore, effectively prevented.

It will be understood that in a multi-unit locomotive or in a multiple-car electric train, wherein each unit or car has its own throttle lever and associated operating means, each such unit or car would be provided with its own alertness detection system, usable as and when necessary. Of these, however, in any given train, only the one in the first unit would be active, since in all other units the throttle lever contact member 5 would always remain closed, hereby preventing the initiation of any timing cycles by keeping the respective relays R–1 energized at all times.

It will further be understood that the principles of the present invention are applicable as well to road vehicles such as buses and trucks. In any such vehicle, the alertness detection system would preferably also be tied in with the drive or traction motor of the vehicle. To this end, a suitable contact arrangement controlling the electrical energy circuit for the motor may be provided, either as an adjunct of the electromagnet 18 or as a part of an additional relay, and appropriately connected into the circuit 1 to bring the vehicle to a halt if the driver intentionally or otherwise ignores the warning signal. Except for the choice of the electrical circuit components in relation to the operating voltages to be encountered thereby, and the choice of the air valve arrangement in relation to the particular brake apparatus to be controlled, however, the system will have the basic characteristics hereinset forth.

In any application, of course, it will be recognized that the alertness detection and vehicle control system of the present invention is not only foolproof in operation, but also is much less complex than heretofore known systems designed for this purpose and thus is relatively inexpensive to produce and easy to install. Moreover, in view of the simplicity of the system and its components, the possibility of failure thereof during the useful life of the vehicle is practically nil, whereby its economic advantages are even further enhanced.

Although I have described and illustrated herein preferred embodiments of my invention, the disclosure is to be taken as representative only, and it will be clear to those skilled in the art that many changes and variations may be made in the disclosed alertness detection and vehicle control system without any departure from the spirit and scope of my invention as defined in the hereto appended claims.

Thus, in the electric circuit 1, any component thereof which is described as normally energized and as being deenergized to perform a given function may, by appropriate changes of the associated connections, be normally deenergized and then energized to perform that same function, and vice versa. The principal requirements to be observed are the following:

(a) The time cycle relay R–1 must be operable in one of its states of energization to maintain the electromagnet operator 18–20 of the control valve 21 in that one of its states of energization in which it holds the valve inactive (as far as impeding the normal progress of the vehicle is concerned), and the time cycle relay must simultaneously be operable to maintain the signal-controlling relay R–2 in that one of its states of energization in which the signal-emitting device 44 and the reset relay R–3 are inactive.

(b) The time cycle relay must further be operable, when shifted to the other of its states of energization, to effect after a first preset time interval the shifting of the signal-controlling relay to its other state of energization in which the signal-emitting device is actuated and in which the reset relay becomes susceptible to actuation, and to effect, after a second preset time interval succeeding said first time interval and in the absence of a reset operation by the vehicle operator, the shifting of the electromagnet operator to its second state of energization permitting the activation of the control valve.

(c) The reset relay must be operable, when shifted out of its normal state of energization by a circuit-switching action of the vehicle operator responding to the stimulus of the warning signal, to effect the temporary returning of the time cycle relay to its first state of energization, thereby to enable the return of both the signal-controlling relay and the reset relay to their first states of energization, which in turn permits the time cycle relay to be shifted again to its second state of energization to start another time cycle.

As used herein, of course, the term "state of energization" means either the energized or the deenergized condition of the particular circuit component referred to.

It will also be apparent that the signal-emitting device 44 may be constructed to provide, in lieu of an audible signal only, either a visual signal or a combination audible and visual signal of any kind. Still further modifications of and substitutions for the structures and structural relationships disclosed herein will readily suggest themselves to those skilled in the art.

Having described my invention, what I claim and desire to secure by Letters Patent is:

1. An alertness detection system for the operator of a self-propelled vehicle equipped with control means operable to impede the normal progress of the vehicle, comprising electromagnet operator means for said control means and operable when energized to maintain the latter inactive, first electric relay means having first and second sets of contacts arranged to be closely simultaneously upon energization of said first relay means and to be opened in timed sequence at respective preset time intervals subsequent to deenergization of said first relay means, said first set of contacts being electrically connected to said electromagnet operator means and when closed being operable to maintain the latter energized, signal-emitting means, second electric relay means having third, fourth and fifth sets of contacts ganged with each other, said third set of contacts being operable when closed to effect the actuation of said signal-emitting means, said second set of contacts being electrically connected to said second relay means and when closed being operable to maintain the latter energized and thereby said third, fourth, and fifth sets of contacts open, and reset circuit means connected to said fourth and fifth sets of contacts and said first relay means, said reset circuit means actuatable by the vehicle operator within the time interval subsequent to the opening of said second set of contacts and the actuation of said signal-emitting means for temporarily reenergizing said first relay means to again close said second set of contacts, thereby to reopen said third, fourth and fifth sets of contacts for deactuating said signal-emitting means and said reset circuit means so as to initiate another time cycle.

2. A system according to claim 1, further comprising a control switch arranged to be open when the vehicle is in motion and to be closed only when the vehicle is at normal rest or brought to a halt by the vehicle operator, said control switch being operable when closed to maintain said first relay means permanently energized, thereby to prevent the initiation of any time cycle.

3. An alertness detection system for the operator of a self-propelled vehicle equipped with control means operable to impede the normal progress of the vehicle, comprising electromagnet operator means for said control means and operable when energized to maintain the latter inactive, first electric relay means having first and second sets of contacts arranged to be closed simultaneously upon energization of said first relay means and to be opened in timed sequence at respective preset time intervals subsequent to deenergization of said first relay means, said first set of contacts being electrically connected to said electromagnet operator means and when closed being operable to maintain the latter energized, signal-emitting means, second electric relay means having third, fourth and fifth sets of contacts ganged with each other and arranged to be open upon energization of said second relay means, said third set of contacts being operable when closed to effect the actuation of said signal-emitting means, said second set of contacts being electrically connected to said second relay means and when closed being operable to maintain the latter energized, third electric relay means having sixth and seventh sets of contacts ganged with each other and arranged to be closed upon energization of said third relay means, and manually operable switch means actuatable by the vehicle operator within the time interval subsequent to the opening of said second set of contacts and the actuation of said signal-emitting means for temporarily energizing said third relay means through said fourth and fifth sets of contacts to close said sixth and seventh sets of contacts, whereby upon reversal of said switch means said third relay means is held energized by said sixth set of contacts and said first relay means is reenergized through said seventh set of contacts to again close said second set of contacts, thereby to open said third, fourth and fifth sets of contacts of said second relay means for deactuating said signal-emitting means and deenergizing said third relay means so as to open said sixth and seventh sets of contacts to again deenergize said first relay means and initiate another time cycle.

4. A system according to claim 3, further comprising a control switch arranged to be open when the vehicle is in motion and to be closed only when the vehicle is at normal rest or brought to a halt by the vehicle operator, said control switch being operable when closed to maintain said first relay means permanently energized, thereby to prevent the initiation of any time cycle.

References Cited

UNITED STATES PATENTS 2,575,926  11/1951  Murray.
2,625,594  1/1953  Mathis.

EUGENE G. BOTZ, *Primary Examiner.*